United States Patent Office 3,128,229
Patented Apr. 7, 1964

1

3,128,229

STABILIZATION OF VIRAL VACCINE AND INACTIVATION OF ADVENTITIOUS TISSUE CULTURE CONTAMINANTS THEREIN

Joseph L. Melnick and Craig Wallis, Houston, Tex., assignors to Baylor Medical Foundation, Houston, Tex., a non-profit corporation of Texas No Drawing. Filed Oct. 5, 1961, Ser. No. 143,038
2 Claims. (Cl. 167—78)

This invention relates to certain viruses of the ribonucleic acid-containing (RNA) type and to vaccines made from them, particularly to live poliovirus vaccines. Moreover, it relates to methods for stabilizing certain RNA viruses and vaccines made from them and to methods for separating extraneous viruses inadvertently incorporated into the virus harvests from which the vaccine is prepared. The present application is a continuation-in-part of our application Serial No. 128,953, filed August 3, 1961, now abandoned. Since the introduction of tissue culture procedures attenuated strains of many viruses have been cultivated. These strains have lost their ability to cause clinical symptoms but retain the ability to multiply and when used in a vaccine to protect the host from subsequent infection with virulent strains of the same virus. The infectivity of the virus is essential to these actions and therefore to the efficacy of the live attenuated virus vaccine.

The problem of retaining the infectivity of the virus prior to use is well recognized. Generally, special refrigeration requirements must be met if the vaccine products are to have even a short usable life period. The expenses of refrigeration adds materially to their price. But adding even more materially to the cost of the vaccines is the fact that because of the short usable life period when held at above freezing temperatures much of the vaccine may be returned to the manufacturer unused.

Prior art procedures for retaining infectivity of live virus vaccines notably vaccinia virus include in addition to storage in the frozen form, storage in the dried form, cold storage in combination with glycerol, and addition of sodium chloride, potassium chloride, or ammonium chloride in concentrated solutions. These methods except for storage under refrigeration which has only a limited usefulness, while suitable for viruses of the DNA-type such as vaccinia virus, are less suitable for the RNA-type viruses which tend to be less stable than vaccinia virus. The polioviruses in the suspensions utilized for oral vaccines are particularly sensitive to deterioration, especially when dried, or even in the fluid state when held at temperatures above freezing, when contrasted to the crude tissue extracts of infected tissue utilized for smallpox vaccine.

Another problem arising in the preparation of virus tissue culture vaccines is the inadvertent incorporation of viruses present as spontaneous contaminants of the cell cultures into the virus harvest from which the vaccine is prepared. In the case of live poliovirus vaccines, the virus for which is usually grown in monkey kidney cultures, the contaminating virus may be carried along with the vaccine virus and find its way into the final vaccine. Thus many lots of live poliovirus vaccine, particularly those prepared from rhesus monkey (*Macaca mulatta*) kidney cultures, have contained relatively high concentrations of vacuolating virus (as high as $10^5 TCD_{50}$ per ml. of vaccine).

It is an object of our invention to provide an inexpensive and simple method for increasing the period of time during which live poliovirus vaccines will retain their full viability and infectivity even at temperatures up to 50° C. and to provide live poliovirus vaccines which are usable for several months or more when refrigerated at above

2 freezing temperatures customarily used for biological products generally, and for weeks when kept at room temperature. It is a further object of our invention to provide a means of eliminating extraneous viruses present in a harvest for vaccine production while stabilizing the desired virus for use in the vaccine.

We have made the surprising discovery that divalent metal cations such as those of magnesium, calcium, zinc, cobalt, or manganese in high concentrations will delay the deterioration of types 1, 2, and 3, attenuated and virulent polio strains at temperatures from 0° C. to more than 50° C., while not altering the *d* and *t* (rct/40° C.) markers or the low monkey neurovirulence properties characterizing the attenuated strains. Furthermore, while the presence of these divalent metal cations stabilized the particularly sensitive RNA poliovirus, it had no stabilizing effect on the extraneous viruses present as contaminants in the virus suspensions obtained from monkey kidney cultures, thus permitting inactivation of the latter. Surprisingly, we also discovered that the stabilization of the RNA virus effected by the divalent cation was independent of the anion of the salt added.

In this aspect our invention is carried out by adding concentrated solutions containing divalent metal cations, preferably magnesium in the form of magnesium chloride, to suspensions of the desired live virus until the final concentration is from approximately 0.5 M to saturated solutions. The resulting virus suspension may be used as an oral vaccine in this form, with or without other additives, preservatives, extenders or the like or it may be treated to inactivate extraneous viruses present by heating to 50° C. for one to two hours and then used with or without the aforementioned additives, etc.

In another aspect of our invention we have made the surprising discovery that non-toxic trivalent cations, for example, trivalent aluminum, will also protect types 1, 2 and 3 attenuated poliovirus from thermal inactivation without altering their viability and infectivity. Trivalent aluminum is used preferably in the form of aluminum chloride or aluminum sulfate with the final concentrations being from about 0.0001 molar to 0.1 molar.

In this aspect of our invention, for example, when aluminum chloride is added to oral polio vaccine strains so that the trivalent aluminum cation concentration is between 0.0001 M and 0.1 M, the suspension may be heated to 48° C. for one hour with no loss in infectivity. At these concentrations, the trivalent salt enhances the thermal deterioration of viruses sometimes present as contaminants of tissue culture cells in which the poliovirus vaccine strain is grown. This aspect of our invention also permits the easy destruction of the undesirable contaminating virus in the poliovirus suspension.

For example, aluminum chloride added to result in the concentrations set forth to attenuated poliovirus suspensions prepared in monkey kidney cultures contaminated with vacuolating $SV_{40}$ virus and the resulting suspension heated for one hour at 48° C. destroyed the vacuolating $SV_{40}$ virus leaving the desired poliovirus behind intact and fully infectious.

In another aspect of our invention we have found that mixtures of the divalent metal cations and non-toxic trivalent metal cations when added to suspensions of the live virus in amounts sufficient to form the concentrations set forth result in stabilized poliovirus suspensions which are free from viable extraneous nonpolioviruses. To eliminate the infectious extraneous viruses, the suspensions containing the mixtures of divalent and trivalent cations may stand at any temperature up to 50° C. for periods of time longer than one hour and be used as an oral vaccine in this form with or without other additives, preservatives, extenders and the like.

The following examples are given to illustrate our invention and are not to be regarded as limitations of their invention, may variations of which are possible without departing from its spirit or scope.

*Example I*

Magnesium chloride ($MgCl_2.6H_2O$) was dissolved in distilled water to make a 2 molar solution. The solution was then sterilized by autoclaving for 15 minutes at 15 lbs. pressure. When the solution had cooled, an equal volume of type 1 attenuated vaccine strain of poliovirus was mixed with an equal volume of the 2 molar solution, making a stabilized virus suspension, usable as a vaccine, containing magnesium chloride in 1 molar concentration.

*Example II*

The vaccine of Example I was heated to 50° C. and maintained at this temperature for 1 hour which inactivated the infective vacuolating $SV_{40}$ virus present as a contaminant.

*Example III*

As in Example I, a 2 molar sterile solution of magnesium chloride was added to live poliovirus vaccine type 2. This solution was also added to live poliovirus vaccine type 3 and to a mixture of poliovirus vaccine types 1, 2 and 3. These resulted in stabilized virus suspensions usable as vaccines containing magnesium chloride in 1 molar concentration.

*Example IV*

The stabilized virus suspensions, the vaccines, of Example III were treated as in Example II which inactivated the infective vacuolating virus.

*Example V*

In this example, a 1 molar sterile solution of magnesium chloride prepared as in Example I was added to an equal volume of the poliovirus vaccines of Examples I and II. This resulted in stabilized virus suspensions usable as vaccines, containing magnesium chloride in 0.5 molar concentration.

*Example VI*

The stabilized virus suspensions, the vaccines, of Example V were heated as in Example II which inactivated the infective vacuolating $SV_{40}$ virus present as a contaminant.

*Example VII*

In this example, 1 part of the vaccines of Examples I and III were diluted with 10 parts of a saturated sterile solution of magnesium chloride prepared as in Example I. This resulted in stabilized virus suspensions usable as vaccines, containing magnesium chloride in 10/11 saturation.

*Example VIII*

The stabilized virus suspensions, the vaccines of Example VII were treated as in Example II which inactivated the infective vacuolating $SV_{40}$ virus present as a contaminant.

*Example IX*

In this example, sterile solutions of magnesium sulfate, calcium chloride, zinc chloride, manganese sulfate and cobalt chloride were made in accordance with and in the concentrations set forth and added to the poliovirus vaccines set forth in Examples I, III, V and VII. These resulted in stabilized virus suspensions usable as vaccines in the concentrations indicated.

*Example X*

The stabilized virus suspensions, the vaccines, of Example IX were treated as in Example II which inactivated the infective vacuolating virus present as a contaminant.

The volumes of poliovirus vaccine and stabilizing salt solution can be varied as desired as long as the final salt concentration is above 0.4 molar.

It is significant that by heating the stabilized virus suspension, the vaccine, that the infective vacuolating virus are inactivated since heating of the poliovirus vaccine without the divalent metal cation does not inactivate the infective vacuolating virus. The poliovirus suspension may be heated from 0° C. up to 50° C. or not heated at all, as desired. By heating the poliovirus suspension to 50° C. for at least one hour, the inffective vacuolating virus is inactivated as previously mentioned. Preferably, at high temperatures, such as 50° C., the heating should not exceed two hours as prolonged heating at such temperatures causes a loss of effectiveness of the vaccine suspension. Also, the heating at 50° C. can be from about five minutes to one hour as a substantial amount of the infective vacuolating virus is inactivated in five minutes. Heating at 50° C. for about one hour is preferred since it insures inactivation of the inffective vacuolating virus present as a contaminant without destroying the effectiveness of the stabilized virus suspension.

*Example XI*

Aluminum chloride was dissolved in distilled water and filtered to make a sterile 0.2 M solution. An equal volume of type I attenuated vaccine strain of poliovirus was mixed with an equal volume of this solution, which resulted in a stabilized virus suspension, usable as a vaccine, containing aluminum chloride at 0.1 molar concentration.

*Example XII*

The vaccine of Example XI was heated to 48° C. and maintained at this temperature for one hour which inactivated the infective vacuolating virus present as a contaminant.

*Example XIII*

As in Example XI, an 0.2 molar sterile solution of aluminum chloride was added to live poliovirus vaccine type 2 and also to live poliovirus vaccine type 3 and to a mixture of poliovirus vaccine types 1, 2 and 3. These resulted in stabilized virus suspensions usable as vaccines containing aluminum chloride in 0.1 molar concentration.

*Example XIV*

The stabilized virus suspensions, the vaccines, of Example XIII were treated as Example XII which inactivated the infective vacuolating virus present as a contaminant.

*Example XV*

In this example, aluminum chloride in a concentration of 0.0002 M and also in a concentration of 0.2 M was added to live poliovirus vaccines as described in Examples XI to XIV, inclusive. These resulted in stabilized virus suspensions usable as vaccines containing aluminum chloride in 0.0001 M and 0.1 M concentrations, usable as vaccines and when heated as set forth, freed the vaccines of infective vacuolating $SV_{40}$ virus. At concentrations of 0.04 molar or greater, vacuolating $SV_{40}$ virus was inactivated by allowing the virus suspension to remain at temperatures below 48° C.

*Example XVI*

In this example, aluminum sulfate was substituted for aluminum chloride in Examples XI through XV in the concentrations set forth. These resulted in stabilized virus suspensions usable as vaccines in the same concentrations indicated and, when heated as described, inactivated the infective vacuolating virus.

*Example XVII*

In this example a mixture of the divalent and trivalent cations of the preceding examples in the concentrations set forth were added in equal proportions to live poliovirus vaccines as set forth in the preceding examples and in accordance therewith. This resulted in a stabilized virus suspensions usable as vaccines in the concentrations of from 0.0001 to 0.1 molar aluminum and of from 0.4 molar to saturation of magnesium, calcium, zinc, manganese and cobalt. Also, the infective vacuolating virus was inactivated when the mixtures of virus and salts were allowed to stand at temperatures of 50° C. or below, for example, at 25° C. for one hour.

Thus, trivalent cations can also be used, either alone or combined with the divalent cations, to provide stabilized vaccines free of undesirable contaminating viruses.

While for the purpose of disclosure, the specification has been directed primarily toward the stabilization of polioviruses and vaccines made from them, other of the RNA viruses can be stabilized under the conditions set forth; for example, Coxsackie viruses, ECHO viruses and Reoviruses.

In our copending application, Serial No. 186,618, filed April 11, 1962, we described processes and compositions of matter having to do with tissue culture mediums and cell cultures suitable for the production and for the safety testing of viral vaccines. Accordingly, these are not described and claimed in this application.

The present invention is therefore well suited and adapted to carry out the objects and has the advantages mentioned as well as others inherent therein.

While several presently-preferred examples of the invention have been given for the purpose of disclosure, no undue restrictions or limitations are to be imposed by reason thereof but that the present invention is defined by the appended claims.

What is claimed is:

1. The process which comprises adding a concentrated aqueous solution containing at least one member of the group consisting of magnesium chloride, magnesium sulfate, calcium chloride, zinc chloride, manganese sulfate, cobalt chloride, aluminum chloride, aluminum sulfate, and mixtures thereof to an aqueous suspension containing at least one live ribonucleic acid-containing tissue-culture propagated enterovirus, attenuated to avirulence to man, in concentrations effective to inactivate adventitious tissue culture contaminants.

2. A composition of matter consisting of an aqueous suspension containing at least one live ribonucleic acid-containing tissue-culture propagated enterovirus, attenuated to avirulence to man, prepared by adding to said suspension a concentrated aqueous solution containing at least one member of the group consisting of magnesium chloride, magnesium sulfate, calcium chloride, zinc chloride, manganese sulfate, cobalt chloride, aluminum chloride, aluminum sulfate, and mixtures thereof.

References Cited in the file of this patent

UNITED STATES PATENTS

| | | |
|---|---|---|
| 2,529,461 | Schneiderwirth | Nov. 7, 1950 |
| 2,946,724 | Valentine | July 26, 1960 |
| 2,966,443 | Cox | Dec. 27, 1960 |
| 3,035,980 | Tint et al. | May 22, 1962 |
| 3,048,523 | Underwood | Aug. 7, 1962 |
| 3,096,249 | Prigal | July 2, 1963 |

OTHER REFERENCES

Schaeffer et al.: "Purification of Poliomyelitic Virus," Archives of Pathology, vol. 15, pp. 221–226, 1933.

Stanley: Handbuch Ver Virusforschung, 1938, vol. 1, pp. 449–451.

Smolens et al.: Science 122, pages 240–241, 1955.

Gard: World Health Organization Monograph Series, No. 26 (1955), pages 230–235.

Fraenkel-Conrat: N.Y. Academy of Sciences, Special Publ. No. 5, pages 219–227, 1957.

Padgett: J. of Experimental Med., November 1, 1958, pages 651–664.

Rhodes et al.: Textbook of Virology, 1958, pages 59–60, pub. by Williams and Wilkins, Balt., Md.

Soine et al.: Rogers' Inorganic Pharmaceutical Chemistry, 7th Edition, 1961, pub. by Lea and Febiger, Phila., Pa., pp. 463–464, 475, and 637–638.

Wallis et al.: "Stabilization of Poliovirus by Cations," Texas Rep. Biol. Med. 19, pp. 683–700, Fall 1961.

Wallis et al.: "Cationic Inactivation of Vacuolating Virus (SV–40) in Poliovirus Suspensions," Texas Rep. Biol. Med. 19, pp. 701–705, Fall 1961.